(12) United States Patent
Guerrero et al.

(10) Patent No.: US 12,722,029 B2
(45) Date of Patent: Sep. 1, 2026

(54) FACE MASKS AND METHOD OF FABRICATING FACE MASK

(71) Applicant: RAZER (ASIA-PACIFIC) PTE. LTD., Singapore (SG)

(72) Inventors: Gil Jr Palma Guerrero, Singapore (SG); Min-Liang Tan, Singapore (SG); Lionel Lim, Singapore (SG); Charlie Bolton, Singapore (SG); Alvin Sim, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 650 days.

(21) Appl. No.: 18/251,736

(22) PCT Filed: Dec. 24, 2020

(86) PCT No.: PCT/SG2020/050781

§ 371 (c)(1),
(2) Date: May 4, 2023

(87) PCT Pub. No.: WO2022/139676

PCT Pub. Date: Jun. 30, 2022

(65) Prior Publication Data

US 2024/0350838 A1 Oct. 24, 2024

(51) Int. Cl.
*A62B 18/00* (2006.01)
*A41D 13/11* (2006.01)
(Continued)

(52) U.S. Cl.
CPC ........ *A62B 18/006* (2013.01); *A41D 13/1107* (2013.01); *A41D 13/1184* (2013.01);
(Continued)

(58) Field of Classification Search
CPC ... A62B 18/00–10; A62B 23/02; A41D 13/11; A41D 13/1107; A41D 13/1184;
(Continued)

(56) References Cited

U.S. PATENT DOCUMENTS 5,406,944 A 4/1995 Gazzara
6,257,235 B1 7/2001 Bowen
(Continued)

FOREIGN PATENT DOCUMENTS

CN 2905107 Y 5/2007
CN 203777088 U 8/2014
(Continued)

OTHER PUBLICATIONS

Chinese first office action; application No. 202180078693.4; dated May 1, 2025.

(Continued)

*Primary Examiner* — Rachel T Sippel
*Assistant Examiner* — Gwynneth L Howell
(74) *Attorney, Agent, or Firm* — Polsinelli PC

(57) ABSTRACT

According to various embodiments, a face mask includes a cover shield, an input and an output fan. The cover shield is shaped to cover nose and mouth of a wearer, and defines an inner space between the cover shield and the skin of the wearer. The input fan is coupled to the cover shield, and is configured to draw air from outside into the inner space. The output fan is coupled to the cover shield, and is configured to expel air out of the inner space.

20 Claims, 13 Drawing Sheets

(51) Int. Cl.

| | |
|---|---|
| ***A62B 18/02*** | (2006.01) |
| ***A62B 18/08*** | (2006.01) |
| ***A62B 23/02*** | (2006.01) |
| ***G06F 3/16*** | (2006.01) |
| ***H04M 1/60*** | (2006.01) |
| ***H05B 47/165*** | (2020.01) |
| ***H05B 47/175*** | (2020.01) |
| ***H05B 47/19*** | (2020.01) |
| *H05B 47/155* | (2020.01) |

(52) U.S. Cl.

CPC .......... *A62B 18/003* (2013.01); *A62B 18/025* (2013.01); *A62B 18/08* (2013.01); *A62B 18/082* (2013.01); *A62B 23/02* (2013.01); *G06F 3/162* (2013.01); *G06F 3/167* (2013.01); *H04M 1/6066* (2013.01); *H05B 47/165* (2020.01); *H05B 47/19* (2020.01); *H05B 47/197* (2024.01); *H05B 47/155* (2020.01)

(58) Field of Classification Search

CPC ................ A61M 16/047; A61M 16/06; A61M 16/0605; A61M 16/0627; A61M 2016/0661

See application file for complete search history.

(56) References Cited

U.S. PATENT DOCUMENTS

| | | | | |
|---|---|---|---|---|
| 10,342,999 | B2 | 7/2019 | Song et al. | |
| 10,744,352 | B2 * | 8/2020 | Tucker | A62B 23/025 |
| 2010/0224190 | A1 * | 9/2010 | Tilley | A62B 18/006 128/205.12 |
| 2018/0078798 | A1 | 3/2018 | Fabian et al. | |
| 2019/0009114 | A1 * | 1/2019 | Han | A41D 1/002 |
| 2021/0345695 | A1 * | 11/2021 | Adams | A62B 9/006 |
| 2021/0361982 | A1 * | 11/2021 | Lin | A62B 18/084 |
| 2021/0379424 | A1 * | 12/2021 | Connor | A62B 18/003 |
| 2022/0032091 | A1 * | 2/2022 | Al-Jafar | A62B 18/08 |
| 2022/0040506 | A1 * | 2/2022 | Ansari | A62B 18/006 |
| 2022/0118288 | A1 * | 4/2022 | Space | F24F 8/80 |
| 2025/0269211 | A1 * | 8/2025 | Jumbe | A62B 9/006 |

FOREIGN PATENT DOCUMENTS

| | | | |
|---|---|---|---|
| CN | 205358333 | U | 7/2016 |
| CN | 106730464 | A | 5/2017 |
| CN | 106807000 | A | 6/2017 |
| CN | 107007950 | A | 8/2017 |
| CN | 107684676 | A | 2/2018 |
| CN | 108472517 | A | 8/2018 |
| CN | 111317935 | A | 6/2020 |
| CN | 111840845 | A | 10/2020 |
| CN | 111973905 | A | 11/2020 |
| CN | 211835873 | U | 11/2020 |
| CN | 112096645 | A | 12/2020 |
| JP | 6775862 | B1 | 10/2020 |
| KR | 10-2017-0111132 | A | 10/2017 |
| KR | 10-1783804 | B1 | 10/2017 |
| KR | 10-1997813 | B1 | 10/2019 |
| KR | 10-2071178 | B1 | 1/2020 |
| KR | 10-2104676 | B1 | 4/2020 |
| KR | 20200126488 | A | 11/2020 |
| KR | 20200140684 | A | 12/2020 |
| TW | 243190 | U | 9/2004 |
| TW | M557622 | U | 4/2018 |
| WO | 2018/058421 | A1 | 4/2018 |
| WO | WO 2020-204320 | A1 | 10/2020 |

OTHER PUBLICATIONS

Chinese first office action; application No. 202080107644.4; dated Jun. 18, 2025.

European Search report; dated Jan. 23, 2024; Application # 20967146.

Taiwan Intellectual Property Office Action; dated Oct. 18, 2024; Application #110146221.

International Patent Application No. PCT/SG2020/050781; International Search Report and Written Opinion mailed Sep. 10, 2021; 10 pgs.

Office Action mailed Nov. 27, 2025 in corresponding Taiwanese Patent Application No. 110146221 (33 pages).

* cited by examiner

FACE MASKS AND METHOD OF FABRICATING FACE MASK

CROSS-REFERENCE TO RELATED APPLICATIONS

This application is a national stage application (under 35 U.S.C. § 371) of International Patent Application No. PCT/SG2020/050781 filed Dec. 24, 2020, the content of which is incorporated herein by reference to its entirety.

TECHNICAL FIELD

Various embodiments relate to face masks and methods of fabricating face masks.

BACKGROUND

Face masks are useful for providing protection against air pollution, as well as infectious diseases. Examples of face masks include disposable medical masks like the N95 mask and surgical masks, and reusable cloth masks. However, face masks can only be effective in protecting the wearers, if the wearers would keep them on their faces. It is common for wearers to remove their face masks from time to time, due to the discomfort associated with wearing face masks. It may be difficult to breathe through the face masks, especially for young children and elderly folks. Further, the face masks partially obscure the wearers' faces, so it is difficult to recognize people when they are wearing face masks. The face masks also obscure the wearers' facial expressions, thereby inhibiting normal social interaction.

SUMMARY

According to various embodiments, there may be provided a face mask. The face mask may include a cover shield, an input and an output fan. The cover shield may be shaped to cover nose and mouth of a wearer, and may define an inner space between the cover shield and the skin of the wearer. The input fan may be coupled to the cover shield, and may be configured to draw air from outside into the inner space. The output fan may be coupled to the cover shield, and may be configured to expel air out of the inner space.

According to various embodiments, there may be provided a method of fabricating a face mask. The method may include providing a cover shield shaped to cover the nose and mouth of a wearer, wherein the cover shield defines an inner space between the cover shield and the skin of the wearer. The method may further include coupling an input fan to the cover shield, wherein the input fan is configured to draw air from outside into the inner space. The method may further include coupling an output fan to the cover shield, wherein the output fan is configured to expel air out of the inner space.

Additional features for advantageous embodiments are provided in the dependent claims.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1A:
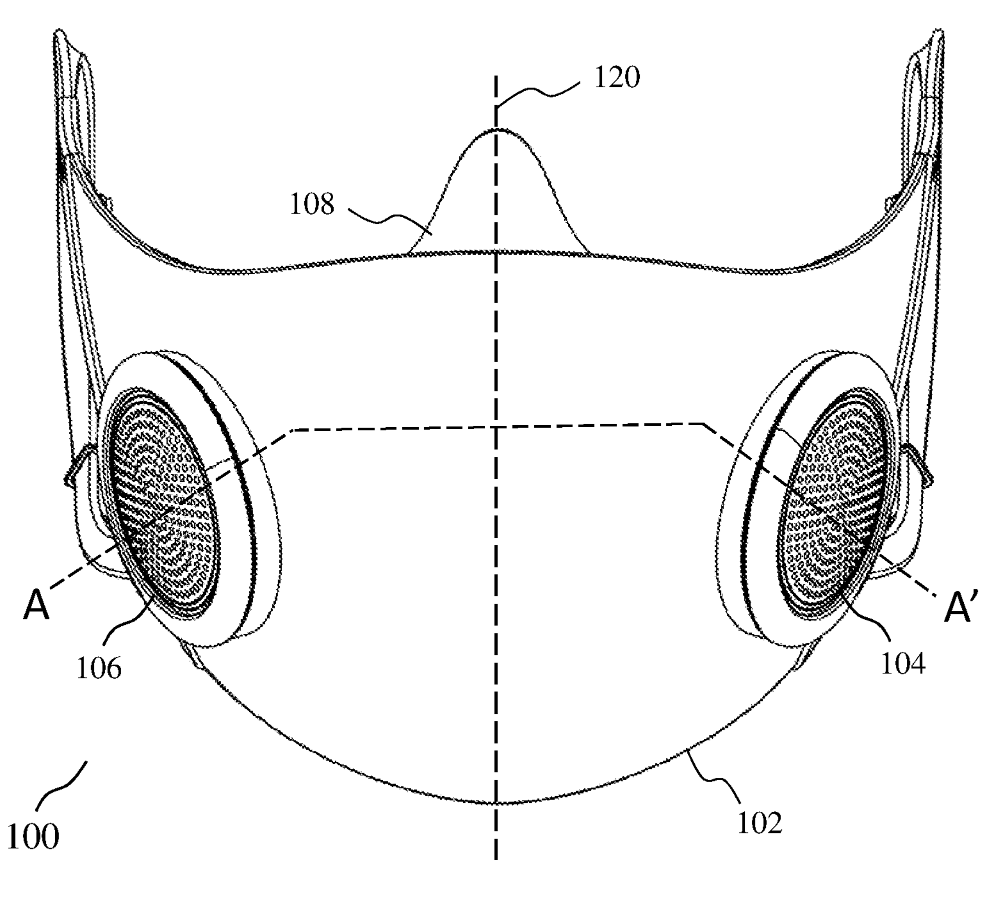
FIGS. 1A and 1B show external views of a face mask according to various embodiments.

Embodiments described below in context of the face masks are analogously valid for the respective methods, and vice versa. Furthermore, it will be understood that the embodiments described below may be combined, for example, a part of one embodiment may be combined with a part of another embodiment.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

It should be understood that the terms "on", "over", "top", "bottom". "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

In order that the invention may be readily understood and put into practical effect, various embodiments will now be described by way of examples and not limitations, and with reference to the figures.

According to various embodiments, a face mask may be provided. The face mask may include a substantially transparent cover shield that is to be worn over a person's nose and mouth, so that the face of the wearer may be visible to other people. This may facilitate social interactions as the wearer can be easily recognized by others, and his or her facial expressions are also visible to others. The face mask may include an internal light, also referred herein as a light emitter arrangement, that may be switched on to shine on the wearer's face, so that the wearer may be recognizable even in dim lighting conditions. The face mask may also include at least one external light, also referred herein as a light signaling member, that may be switched on to display lighting sequences. The lighting sequences may be synchronized with a computer application, such as a computer game. The lighting sequences may be representative of events in the computer application, and may convey information relating to the computer application, to others who are looking at the wearer. The face mask may also be integrated with an eye shield, to provide more comprehensive protection to the wearer.

Figure 1B:
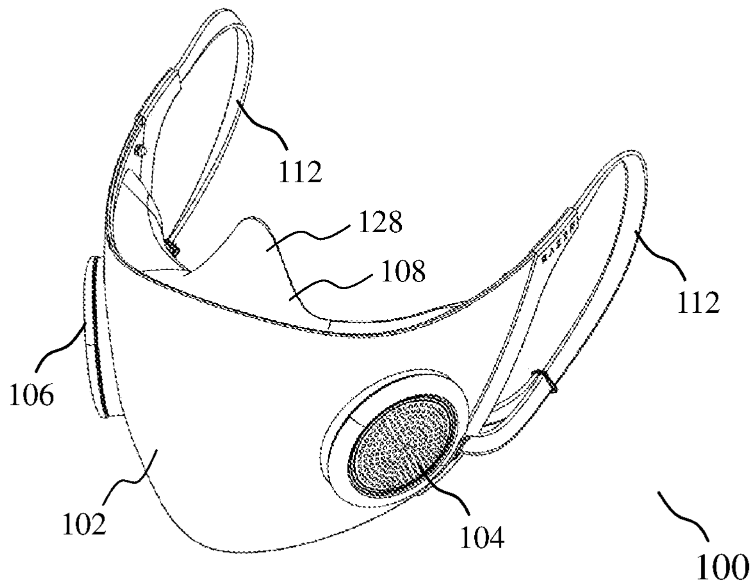

FIGS. 1A and 1B show external views of a face mask 100 according to various embodiments. The face mask 100 may be worn on the face of a wearer. The face mask 100 may include a cover shield 102. The cover shield 102 may be shaped to cover the nose and mouth of the wearer, thereby defining an inner space between the cover shield 102 and the skin of the wearer. The cover shield 102 may serve to physically segregate the inner space from the ambient space. The cover shield 102 may serve to at least partially inhibit transmission of fluids between the wearer and an ambient space that is external to the cover shield 102. The cover shield 102 may be substantially transparent, so that the wearer's face may be visible through the cover shield 102. The cover shield 102 may be curved in shape, so that its opposing edges may bend around the wearer's cheeks. The cover shield 102 may be formed from a polymer, for example, plastic.

While it is preferable for the cover shield 102 to be transparent, in alternative embodiments, the cover shield 102 may be opaque.

The face mask 100 may also include an input fan 104 and an output fan 106 coupled to the cover shield 102. The input fan 104 may be configured to draw air from outside, i.e. the ambient space, into the inner space, while the output fan 106 may be configured to expel air out of the inner space, into the ambient space. While FIG. 1A shows the input fan 104 being on disposed on a left side (from the point of view of the wearer) of the face mask 100 and the output fan 106 being disposed on a right side of the face mask 100, the positions of the input fan 104 and the output fan 106 may be interchanged.

Referring to FIG. 1A which shows a front view of the face mask 100, the input fan 104 and the output fan 106 may be arranged equidistant from a vertical center line 120 of the cover shield 102. The vertical center line 120 is merely an imaginary line helpful for describing the face mask 100. The center line 120 of the cover shield 102 may be aligned with a vertical center line of the wearer's face, and may rest on the wearer's nose. The input fan 104 and the output fan 106 may also be symmetrically arranged about the vertical center line 120.

Referring to FIG. 1B, the face mask 100 may further include a skin cushion 108 arranged along a periphery of the cover shield 102. The skin cushion 108 may be adapted to abut against the skin of the wearer for sealing the inner space from outside. The skin cushion 108 may abut against the skin of the wearer for a substantially airtight seal. The skin cushion 108 may include a compressible or resilient material that may conform to the shape of the face of the wearer. The skin cushion 108 may form a sealing engagement with the skin of the wearer. For example, the skin cushion 108 may include silicone, or a sponge material. The skin cushion 108 may include an integrated nose pad 128. The nose pad 128 may be shaped to rest on the wearer's nose bridge.

The face mask 100 may also include an attachment means configured to attach the face mask 100 to the wearer. The attachment means may be a pair of car loops 112 attached to respective opposite edges of the cover shield 102. In alternative embodiments, the attachment means may be a head band having opposite ends attached to the respective opposite edges of the cover shield 102.

Figure 2:
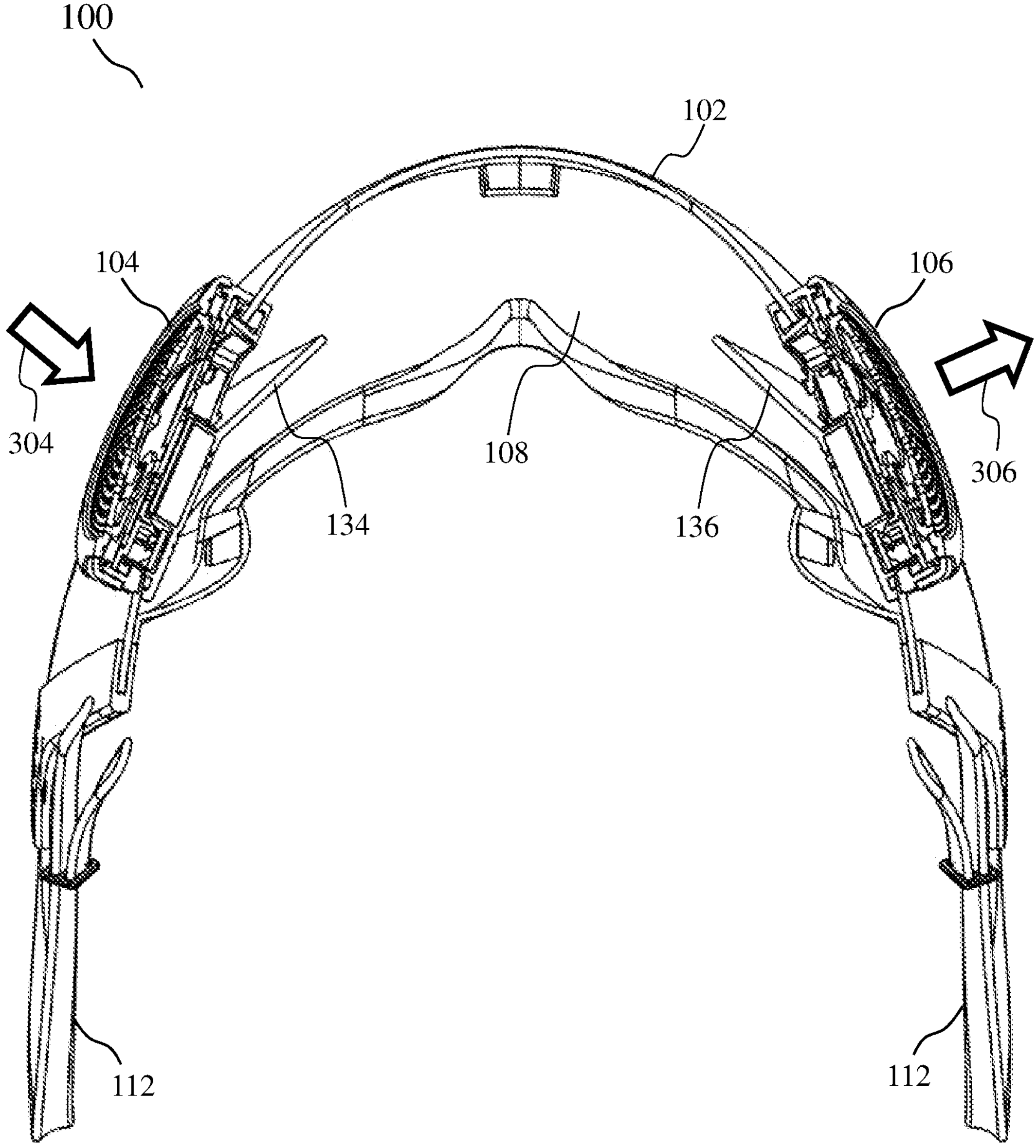
FIG. 2 shows a cross-sectional view of the face mask of FIGS. 1A and 1B.

FIG. 2 shows a cross-sectional view of the face mask 100 cut along line A-A' of FIG. 1A. The cover shield 102 may have two apertures (not shown in the figures) formed in it. The first aperture may be referred to as an inlet aperture. The input fan 104 may draw in air through the inlet aperture, as indicated by the arrow 304. The input fan 104 may be fitted to the inlet aperture, for example, the input fan 104 may fit snugly in the inlet aperture. A major part of the input fan 104 may be arranged on the outer side of the face mask 100. The second aperture may be referred to as an outlet aperture. The output fan 106 may expel air through the outlet aperture, as indicated by the arrow 306. The output fan may be fitted to the outlet aperture, for example, the output fan 106 may fit snugly in the outlet aperture. A major part of the output fan 106 may be arranged on the outer side of the face mask 100. The input fan 104 may be positioned to the cover shield 102 such that the air drawn into the inner space is directed towards the nose and/or the mouth of the wearer. The output fan 106 may be positioned to the cover shield 102 such that the output fan draws away air exhaled from the nose and/or the mouth of the wearer. As a result of the actions of the input fan 104 and the output fan 106, air flow is generated within the inner space so that the wearer is able to breathe in fresh air instead of exhaled air.

At least one of the input fan 104 and the output fan 106 may include a filter holder configured to hold a filter element. The filter holder may be positioned on the respective input fan 104 or output fan 106. The filter holder will be described in further details with respect to FIG. 4B. The filter element may include a non-woven filter sheet. For example, the filter sheet may be similar in composition, to N95 masks, or surgical masks. The filter element received in the filter holder of the input fan 104 (also referred herein as the "input filter") may filter air that is drawn into the inner space. The input filter may protect the wearer from inhaling undesirable particles that are present in the ambient space. The input filter may prevent undesirable particles, such as air pollutants, dust particles, pollens or other allergens, from entering the inner space. The input filter may block the undesirable particles outside of the filter or may trap them within the filter. Consequently, clean air is drawn into the inner space for the wearer to inhale. The filter element received in the filter holder of the output fan 106 (also referred herein as the "output filter") may filter air exhaled from at least one of the nose and the mouth of the wearer. The output filter may prevent respiratory droplets or micro-droplets from being released out into the ambient space. For example, exhalation from the wearer may include droplets carrying germs such as viruses or bacteria. The output filter may block or trap these droplets so that the germs are not passed on to other people who are in the vicinity of the wearer.

Still referring to FIG. 2, the face mask 100 may further include an input air guiding member 134 and an output air guiding member 136. The input air guiding member 134 may be coupled to the input fan 104, and may extend into the inner space. The input air guiding member 134 may be adapted to direct air flow from the input fan 104 to at least one of the nose and mouth of the wearer. The input air guiding member 134 may be coupled to a base of the input fan 104. Similarly, the output air guiding member 136 may be coupled to the output fan 106, and may extend into the inner space. The output air guiding member 136 may be adapted to direct air flow from at least one of the nose and mouth of the wearer, to the output fan 106. The output air guiding member 136 may be coupled to a base of the output fan 106. The respective bases of the input fan 104 and the output fan 106 may face the wearer. The input air guiding member 134 and the output air guiding member 136 may collectively provide a ventilation duct that guides air to flow from the input fan 104 to the output fan 106. When the face mask is in use, the wearer's nose and mouth may lie approximately midway of the ventilation duct.

According to various embodiments, the cover shield 102 may form a waterproof barrier between the inner space and the ambient space. The cover shield 102 may be impermeable to fluids. The input and output fans 104, 106 may be sealingly fitted into the inlet and outlets, respectively. The skin cushion 108 may also form a sealing engagement with the wearer's face. Consequently, gaseous exchange between the ambient space and the inner space may substantially be provided through the input and output fans 104, 106.

While it is preferable for the cover shield 102 to be impermeable to fluids, in alternative embodiments, the cover shield 102 may be partially permeable to fluids, for example, it may be formed from a fabric.

Figure 3A:
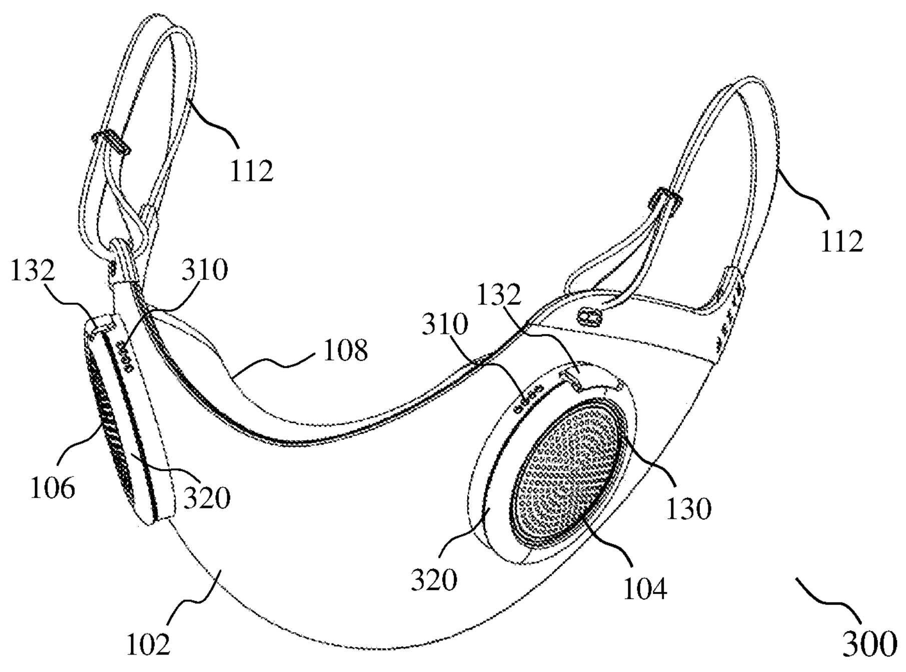
FIGS. 3A and 3B show external views of a face mask according to various embodiments.
Figure 3B:
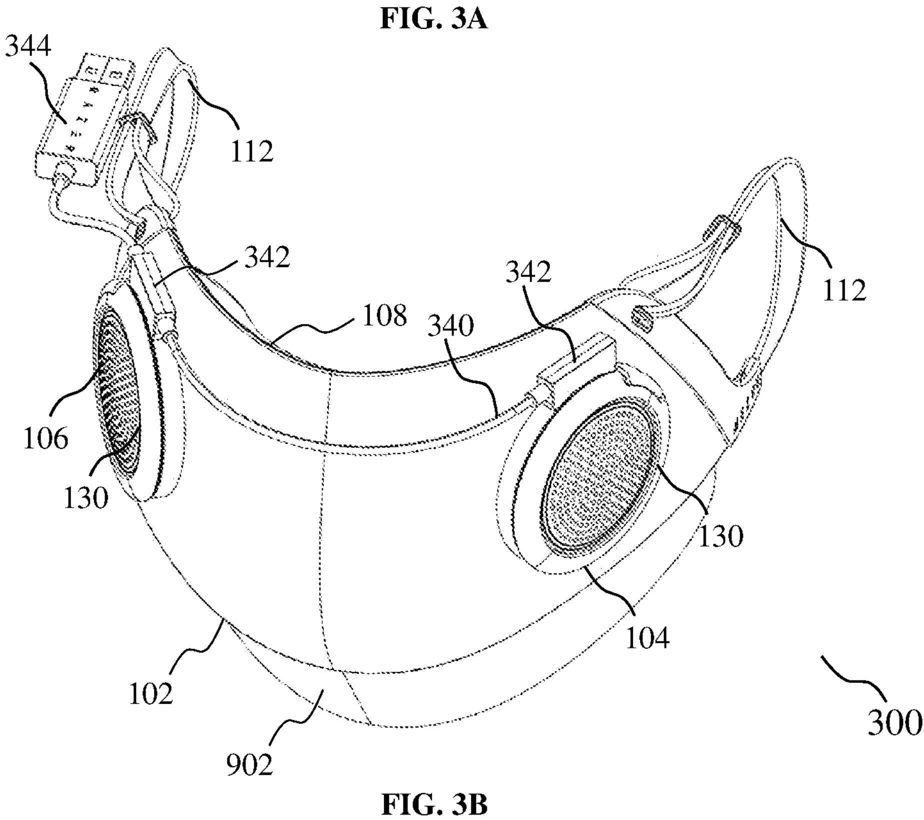

FIGS. 3A and 3B show external views of a face mask 300 according to various embodiments. Similar to the face mask 100, the face mask 300 may also include a cover shield 102, an input fan 104 and an output fan 106. In addition, the face mask 300 may include a light signaling member (not shown in FIGS. 3A and 3B) coupled to at least one of the input fan 104 and the output fan 106, at the outside of the face mask 300.

Referring to FIG. 3A, the light signaling member may be arranged to emit light in a direction away from the face of the wearer. The light signaling member may emit light out of a light transmissive window 130 on a fan cover 320, of the at least one of the input fan 104 and the output fan 106. The light transmissive window 130 may be substantially transparent. While the light transmissive window 130 is shown as a circle in the figures, it may be provided in other shapes. Light emitted by the light signaling member may be visible to other people looking at the wearer. The light signaling member may include at least one light strip, such as a light emitting diode (LED) strip, disposed on a cover of the input fan 104 or the output fan 106. The light signaling member may be configured to display lighting effects, such as different colors and lighting sequences. The light signaling member may include a plurality of light emitters which may be individually controlled. These lighting effects may be controlled by a software run on a processor that may be external to the face mask 300. The light signaling member will be described in further details with respect to FIGS. 7A and 7B.

The input fan 104 and/or the output fan 106 may include a switch 132. The switch 132 may be operable to selectively turn on and off the light signaling member. In addition, the switch 132 may be operable to select a wind speed of the respective input fan 104 or output fan 106.

Still referring to FIG. 3A, the face mask 300 may also include an electrical connector 310. The electrical connector 310 may be disposed on the fan cover 320 of at least one of the input fan 104 and the output fan 106. The electrical connector 310 may be electrically coupled to the light signaling member. The electrical connector 310 may be configured to receive data that includes operating instructions for the light signaling member. The light signaling member may be configured to operate according to the operating instructions. For example, the operating instructions may include the color to be displayed and the timing for the display, for each light emitter in the light signaling member. The electrical connector 310 may include, for example pogo pins, USB female connector or micro USB female connector. The electrical connector 310 may be configured to receive electrical power for charging a battery in the face mask 300. In alternative embodiments, the electrical connector 310 may supply power directly to at least one of the light signaling member, the input fan 104 and the output fan 106.

The face mask 300 may further include a wireless transceiver equipment (not shown in the figures). The wireless transceiver equipment may be coupled to the light signaling member, and may be configured to receive data that includes the operating instructions.

Referring to FIG. 3B, the electrical connector 310 may be connectable to a connector cable 340. The connector cable 340 may include at least one output connection plug 342. The output connection plug 342 may be complementary to the electrical connector 310 and may be connectable with the electrical connector 310. The connector cable 340 may include an input connection plug 344 such a USB male connector.

The face mask 300 may further include a battery configured to supply electrical power to at least one of the input fan 104, the output fan 106, and the light signaling member. The battery may be rechargeable, via the electrical connector 310.

The face mask 300 may optionally include an eye shield 902. The eye shield 902 will be described further with respect to FIGS. 9A and 9B.

Figure 4A:
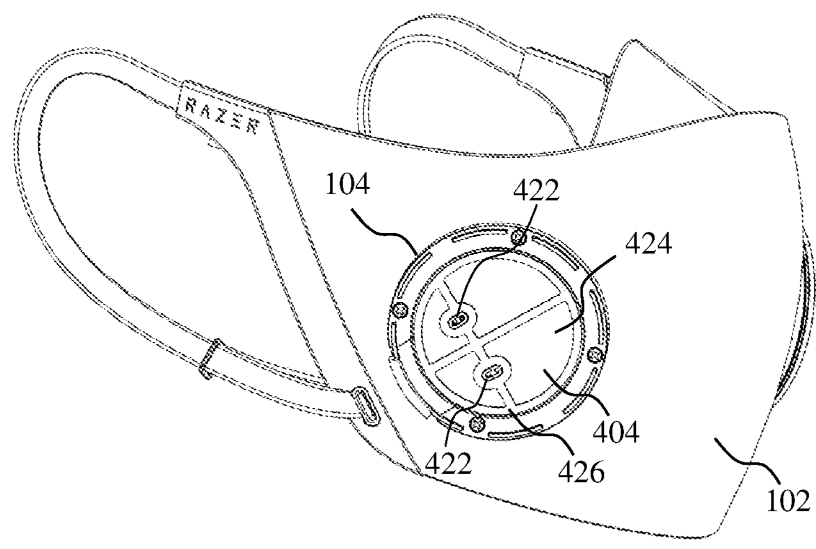
FIGS. 4A to 4C show various disassembled views of an input fan according to various embodiments.
Figure 4B:
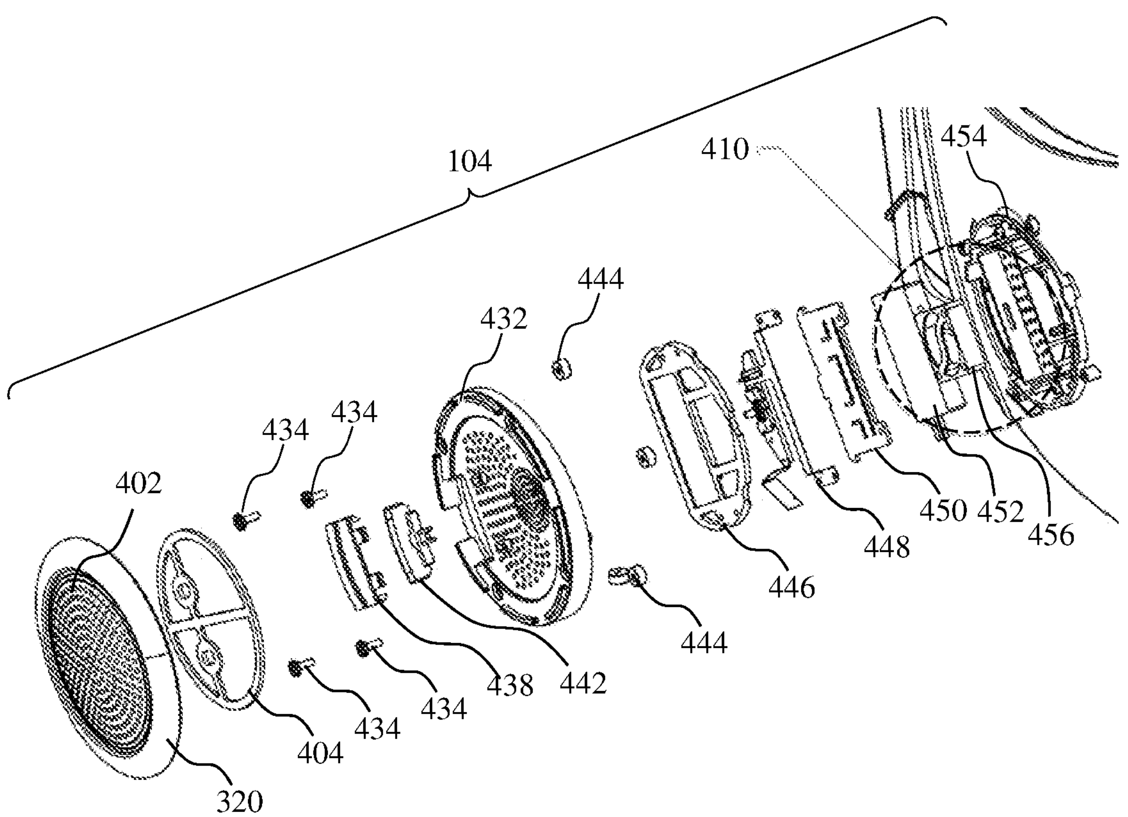
Figure 4C:
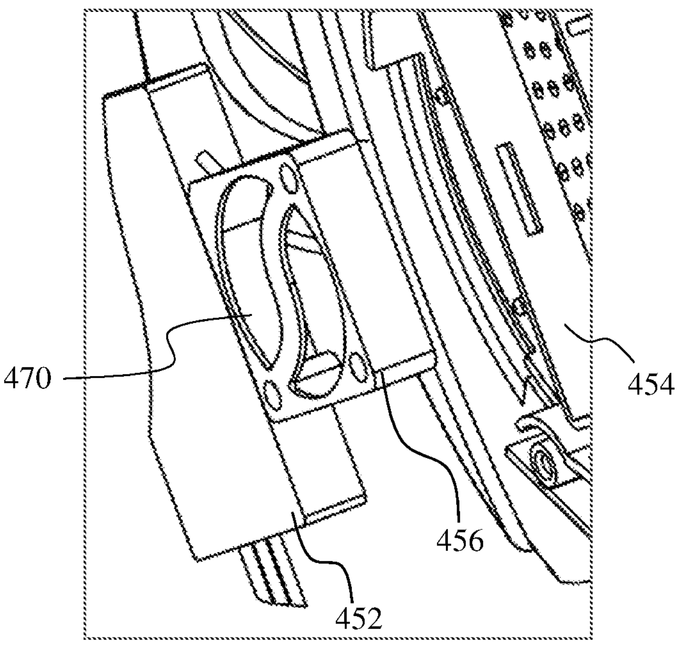

FIGS. 4A to 4C show various disassembled views of the input fan 104 according to various embodiments. The input fan 104 may include a fan cover 320. The fan cover 320 may include at least one opening 402 so that air can flow through the fan cover 320. The fan cover 320 may be detachably coupled to the rest of the input fan 104 via a coupling means.

Referring to FIG. 4A, a filter element 404 may be visible when the fan cover 320 is removed. The fan cover 320 may be removable from the rest of the input fan 104, for easy access to the filter element 404. The filter element 404 may include a filter frame 426 structured to hold a filter sheet 424. The filter sheet 424 may include a filtration material, such as non-woven polymer fibers, for example polypropylene fibers. The filter frame 426 may be shaped to fit onto an intermediate base 432 of the input fan 104. As such, the intermediate base 432 may also be referred to as a filter holder. The filter frame 426 may include openings for accommodating internal electrical connections 422. The filter element 404 may be a consumable item that may be replaced on a periodic basis, or whenever it has become too dirty to perform its filtering function.

FIG. 4B shows an exploded view of the input fan 104. The input fan 104 may include the fan cover 320, the intermediate base 432, and a bottom base 454. The input fan 104 may further include the filter element 404, a switch cover 438 and a switch housing 442, arranged between the fan cover 320 and the intermediate base 432. The switch cover 438 may include a bracket for holding the switch button 442. The switch button 442 may be displaceable, for example, by sliding or depressing, to activate the switch 132. The intermediate base 432 may have a cavity that is shaped to hold the filter element 404. The input fan 104 may further include a plurality of fasteners 434 for attaching the intermediate base 432 to the bottom base 454. The input fan 104 may further include magnets 444, a fan rubber gasket 446, a main circuit board 448, a battery cover 450, a battery 452, and a blower 456, arranged between the intermediate base 432 and the bottom base 454. The magnets 444 may be arranged between the intermediate base 432 and the bottom base 454. The magnets 444 may be the coupling means for detachably coupling the fan cover 320 to the rest of the input fan 104. The fan cover 320 may include a ferromagnetic element, or magnets, so that the fan cover 320 may be magnetically attracted to the magnets 444 to cover the filter element 404. The fan rubber gasket 446 may seal off non-filtered openings in the input fan 104, to prevent air from passing through the non-filtered openings. The main circuit board 448 may house electrical circuits for the input fan 104. The battery cover 450 may serve to isolate the battery 452 from the rest of the face mask 300, in the event that the battery 452 catches fire. The battery cover 450 may have a flammability rating of V-0.

The electrical connections 422 shown in FIG. 4A may connect the main circuit board 448 to the light signaling member. A magnified view of the components 410 including the battery 452, the blower 456 and the bottom base 454, are shown in FIG. 4C. The blower 456 may have an input end 470 and an opposite output end (not shown in FIG. 4C). The blower 456 may include fan blades and a motor. The fan blades may be driven by the motor to rotate, thereby generating an air current. The fan blades may be configured to generate an air current that flows from the input end 470 to the output end. In the input fan 104, the blower 456 may be oriented such that the input end 470 faces the fan cover 320.

Figure 5A:
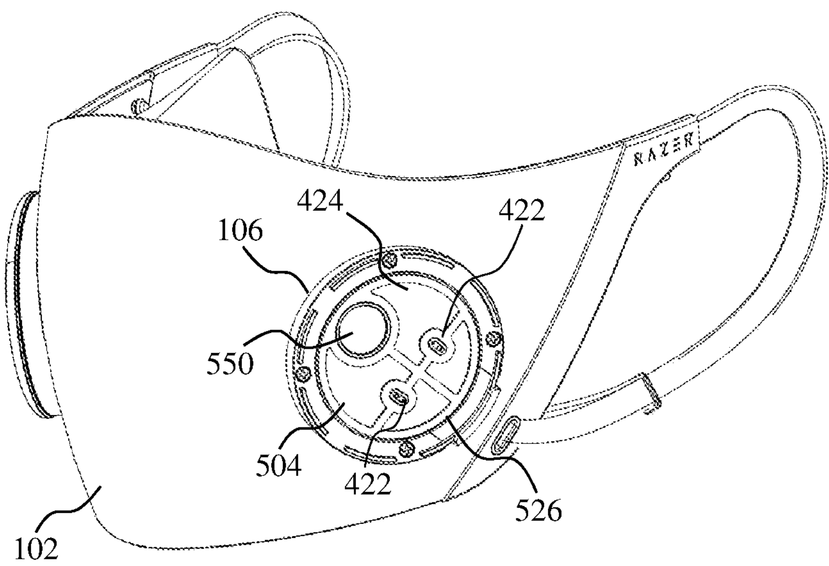
FIGS. 5A to 5C show various disassembled views of an output fan according to various embodiments.
Figure 5B:
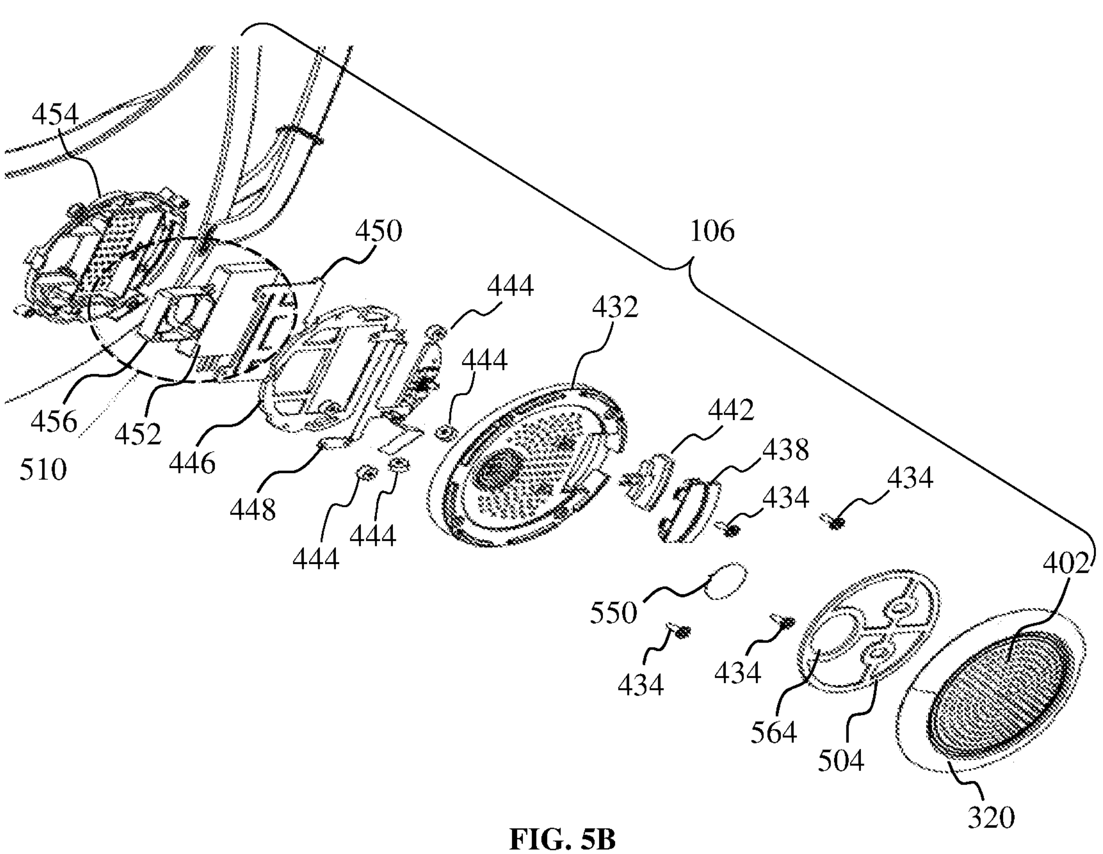
Figure 5C:
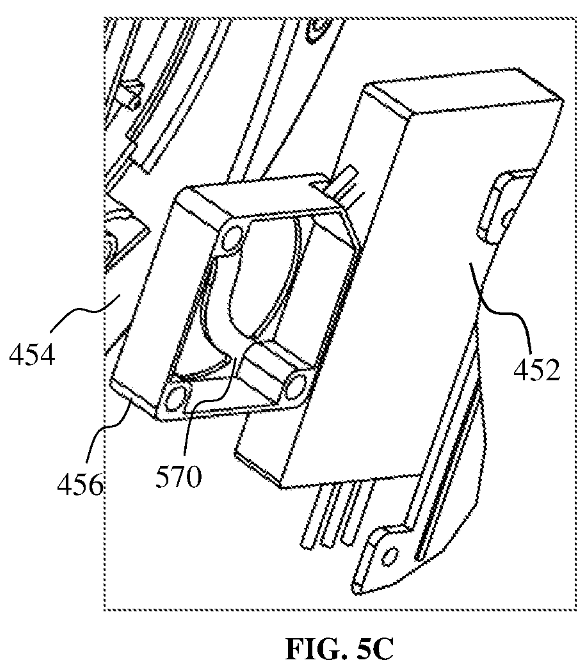

FIGS. 5A to 5C show various disassembled views of the output fan 106 according to various embodiments. Like the input fan 104, the output fan 106 may also include a fan cover 320 that includes at least one opening 402 to allow air flow.

Referring to FIG. 5A, a filter element 504 may be visible when the fan cover 320 is removed. The filter element 504 may include a filter frame 526 structured to hold a filter sheet 424. The filter element 504 may be similar to the filter element 404, but its filter frame 526 may be shaped to have an opening that is the same size or larger, than a valve 550. The valve 550 may be visible through the opening. The valve 550 may be configured to open when the output fan 106 is blowing air out of the face mask 300, and further configured to close when the output fan 106 is turned off. The valve 550 may include a thin rubber membrane and a resilient deformable protrusion. The protrusion may be insertable into an aperture in the intermediate base 432, for attaching the valve 550 to the intermediate base 432. The filter frame 526 may be shaped to fit onto an intermediate base 432 of the output fan 106. As such, the intermediate base 432 may also be referred to as a filter holder. The filter frame 526 may include openings for accommodating internal electrical connections 422.

FIG. 5B shows an exploded view of the output fan 106. The output fan 106 may include similar components as the input fan 104, which are not described in this paragraph for brevity. In addition, the output fan 106 may include the valve 550 that is adapted to fit in an opening 564 of the filter element 504. The valve 550 may be about 0.1 mm in thickness, and may be made from rubber. The valve 550 may restrict air flow to substantially one direction, in the direction of exiting the inner space. In contrast, the input fan 104 may not include a valve 550 and as such, air flow is possible in both directions of into and out of, the inner space at the inlet opening. A magnified view of the components 510 including the battery 452, the blower 456 and the bottom base 454, are shown in FIG. 5C. Comparing with FIG. 4C, the blower 456 of the output fan 106 is arranged to have its blowing direction facing the inner space, i.e. towards the cover shield 102, whereas the blower 456 of the input fan 104 is arranged to have its blowing direction facing away from the inner space, i.e. away from the cover shield 102. The blower 456 may have an input end 470 (not shown in FIG. 5C) and an opposite output end 570. The blower 456 may include fan blades configured to generate an air current that flows from the input end 470 to the output end 570. In the output fan 106, the blower 456 may be oriented such that the output end 570 faces the fan cover 320.

Figures 6A, 6B, 6C:
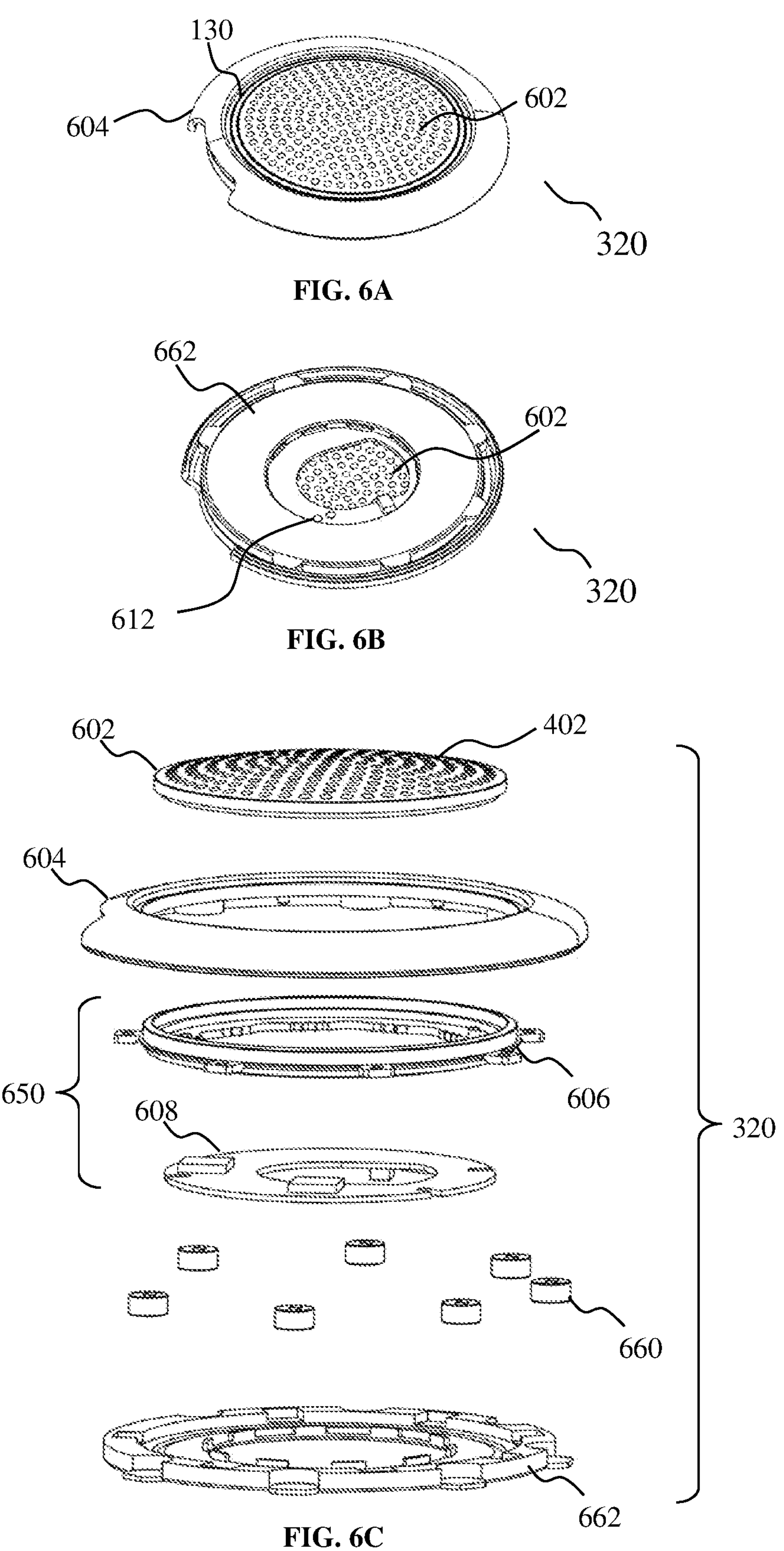
FIGS. 6A to 6C show various views of a fan cover according to various embodiments.

FIGS. 6A to 6C show various views of the fan cover 320 according to various embodiments. The fan cover 320 may include the light signaling member 650.

FIG. 6A show a top perspective view of the fan cover 320. The fan cover 320 may include a top cap 602, a front cap housing 604 fitted around the top cap 602 and a back cap housing 662 (not shown in FIG. 6A). The light transmissive window 130 may be provided on at least one of the top cap 602 and the front cap housing 604.

FIG. 6B shows a bottom perspective view of the fan cover 320. The light signaling member 650 may be arranged between the front cap housing 604 and the back cap housing 662. The light signaling member 650 may be adapted to matingly fit into a cavity in the fan cover 320. The light signaling member 650 may include electrical contact pads 612. The light signaling member 650 may receive electrical power from the battery 452, through the electrical contact pads 612.

FIG. 6C shows an exploded view of the fan cover 320. The top cap 602 may include a plurality of perforations, or openings 402. The front cap housing 604 may surround the top cap 602 circumferentially. The front cap housing 604 may be adapted to hold the light signaling member 650. For example, the front cap housing 604 may include a circumferential groove that may receive the light signaling member 650 in it. For example, the light signaling member 605 may be fastened onto the front cap housing 604 by screws. The light signaling member 650 may include a first light emitting circuit 606 and a second light emitting circuit 608. The first light emitting circuit 606 and the second light emitting circuit 608 will be described with respect to FIGS. 7A and 7B. The fan cover 320 may further include a plurality of magnets 660 between the front cap housing 604 and the back cap housing 662. The magnets 660 may be arranged to have their N-S orientation in opposite directions from the magnets 444, so that the fan cover 320 may be attracted to the magnets 444. The magnets 444 and the magnets 660 may work together to hold the fan cover 320 to the intermediate base 432 or the bottom base 454, to cover the filter element 404.

Figure 7A:
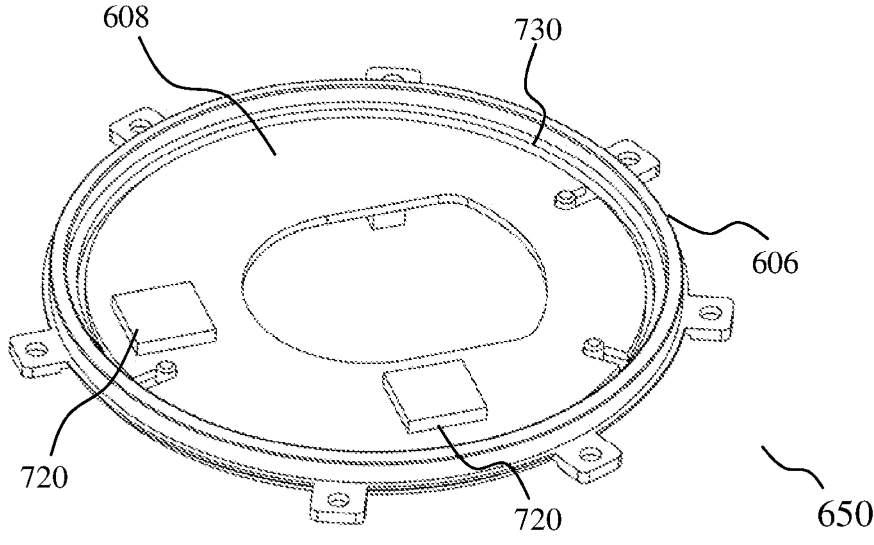
FIGS. 7A and 7B show a top perspective view and a bottom perspective view of a light signaling member, respectively, according to various embodiments.
Figure 7B:
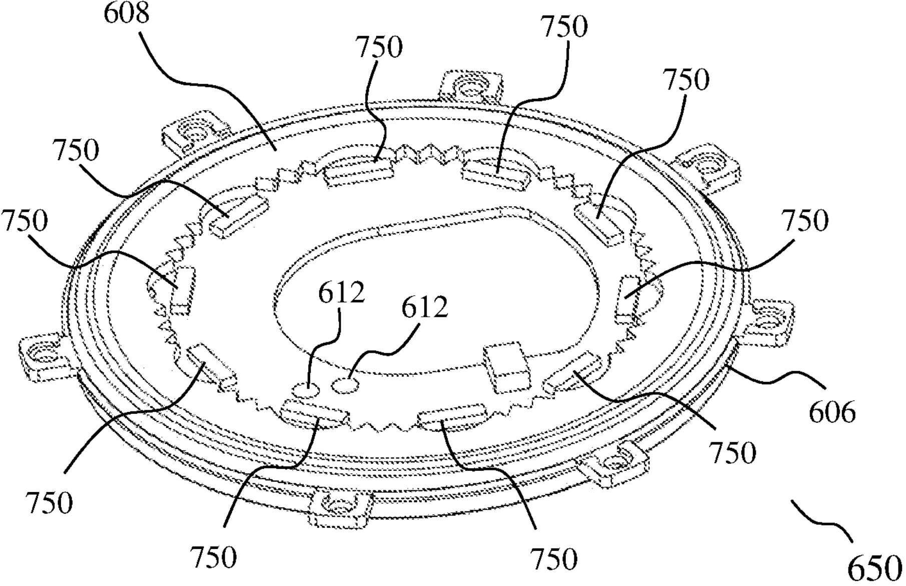

FIGS. 7A and 7B show the top perspective view and the bottom perspective view of the light signaling member 650, respectively, according to various embodiments.

The first light emitting circuit 606 may include at least one processor 720. The processor 720 may be a micro-controller unit configured to control the operating behavior of light emitter(s) 750 provided on the second light emitting circuit 608.

Referring to FIG. 7A, the first light emitting circuit 606 may further include a light guide 730. The light guide 730 may be arranged circumferentially on the first light emitting circuit 606. The light guide 730 may be arranged to be in register with the light transmission window 130. The light guide 730 may include a translucent polymer, for example polycarbonate with added diffuser powder.

Referring to FIG. 7B, the light emitter 750 may be a light emitting diode (LED) array that includes a plurality of LEDs. The light emitter 750 may be configured to selectively emit light of various colors, including red, green, and blue. The light guide 730 may serve to diffuse the light emitted by the light emitter 750, to provide an aesthetically pleasing glow.

Figure 8:
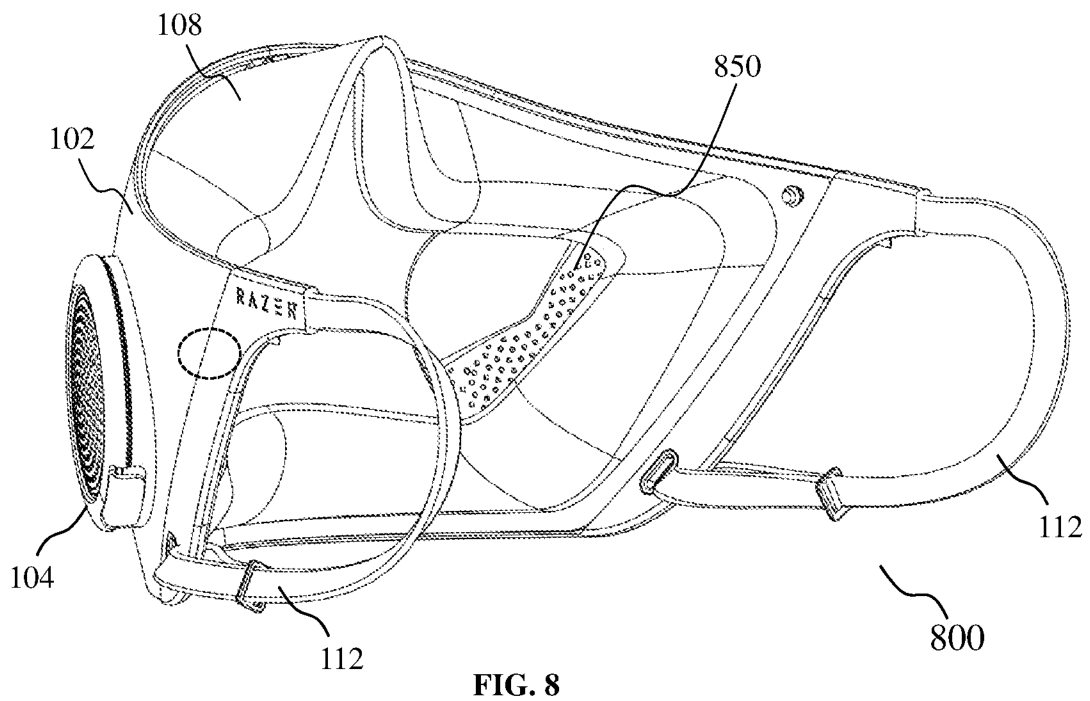
FIG. 8 shows a side perspective view of a face mask according to various embodiments.

FIG. 8 shows a side perspective view of a face mask 800 according to various embodiments. The face mask 800 may be similar to the face mask 100 or 300, and may further include a light emitter arrangement 850 coupled to the cover shield 102, for example, via the input fan 104 and/or the output fan 106. The light emitter arrangement 850 may be provided on the bottom base 454 of at least one of the input fan 104 and the output fan 106. The light emitter arrangement 850 may be configured to emit light, preferably white light, for illuminating the face of the wearer. The light emitter arrangement 850 may be positioned on an inner surface of the cover shield 102 that faces the wearer. The light emitter arrangement 850 may also be coupled to the switch 132, so that it may be selectively operated via the switch 132.

Figure 9A:
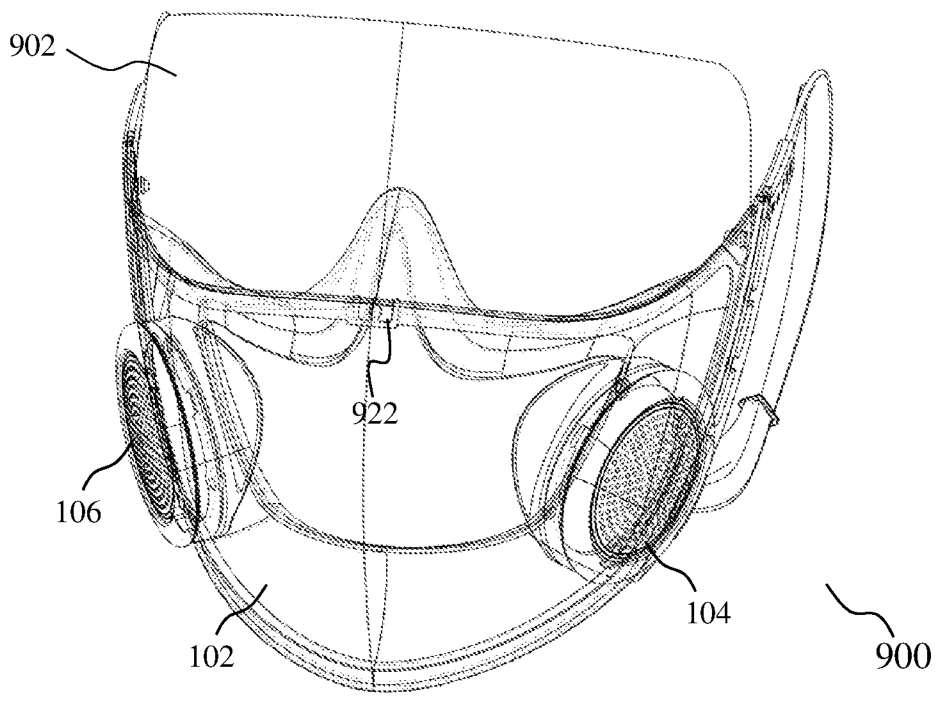
FIGS. 9A and 9B show a front perspective view and a rear perspective view of a face mask, respectively, according to various embodiments.
Figure 9B:
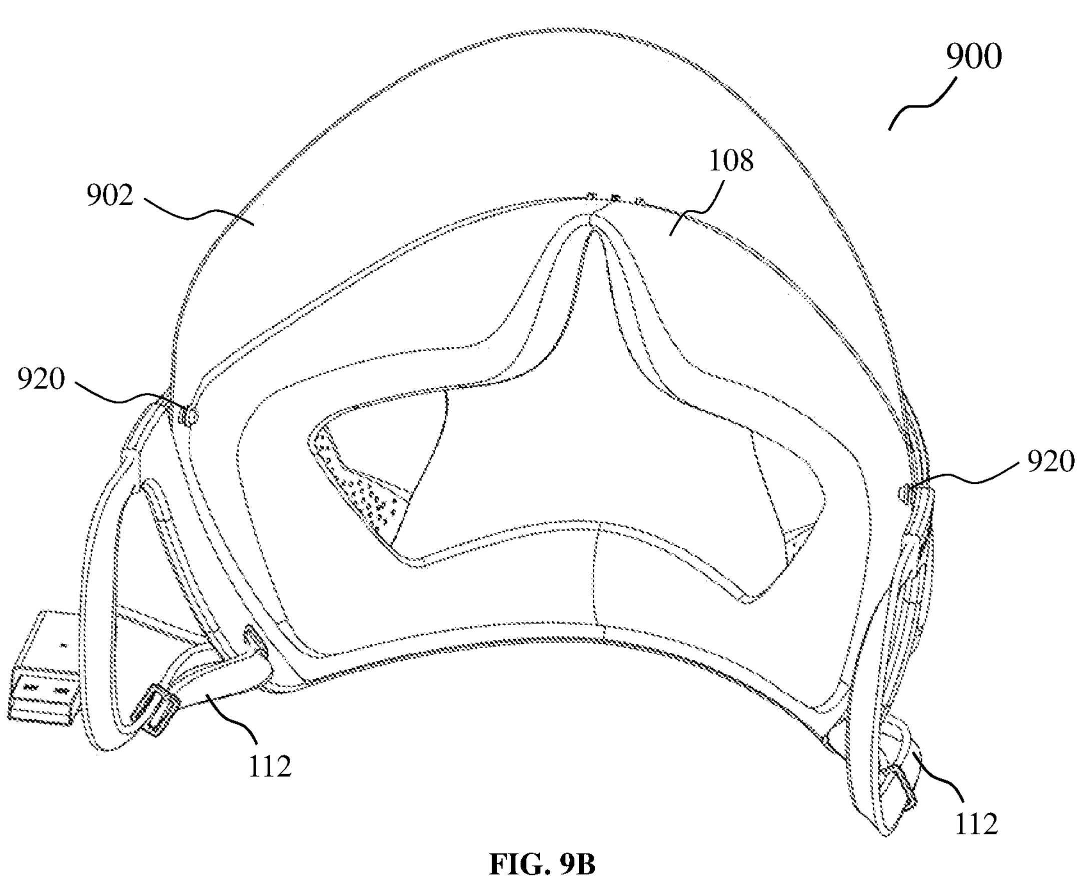

FIGS. 9A and 9B show a front perspective view and a rear perspective view of a face mask 900, respectively, according to various embodiments. The face mask 900 may be similar to the face mask 100, 300, or 800, and may further include at least one mounting member 920 in a vicinity to an upper edge of the cover shield 102. The at least one mounting member 920 may be configured to removably affix an eye shield 902 above the cover shield 102 for covering the eyes of the wearer. The face mask 900 may further include the eye shield 902. The eye shield 902 may include a front fastener 922 shaped to clip onto the cover shield 102.

Figure 10A:
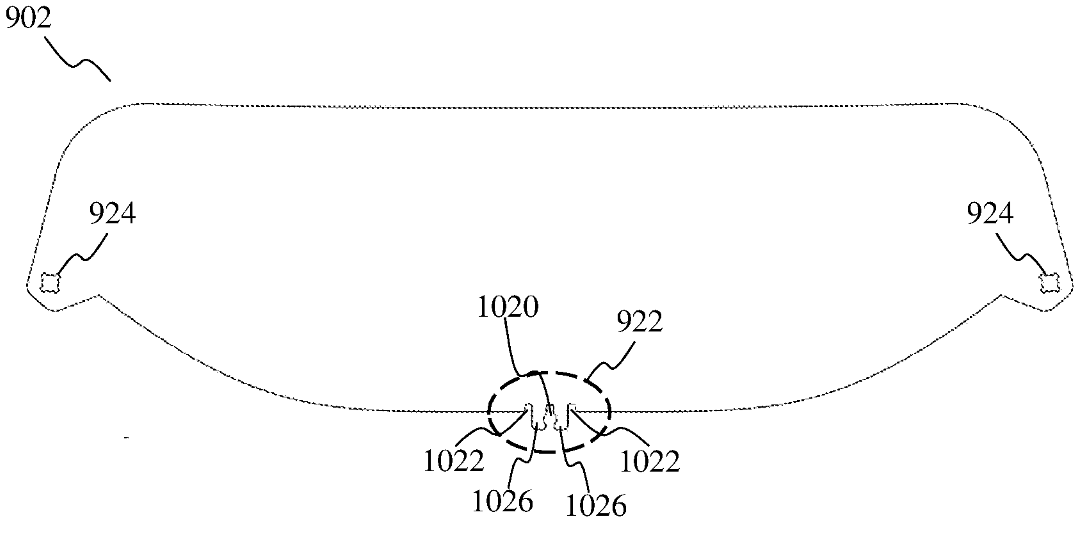
FIGS. 10A and 10B show an eye shield according to various embodiments.
Figure 10B:
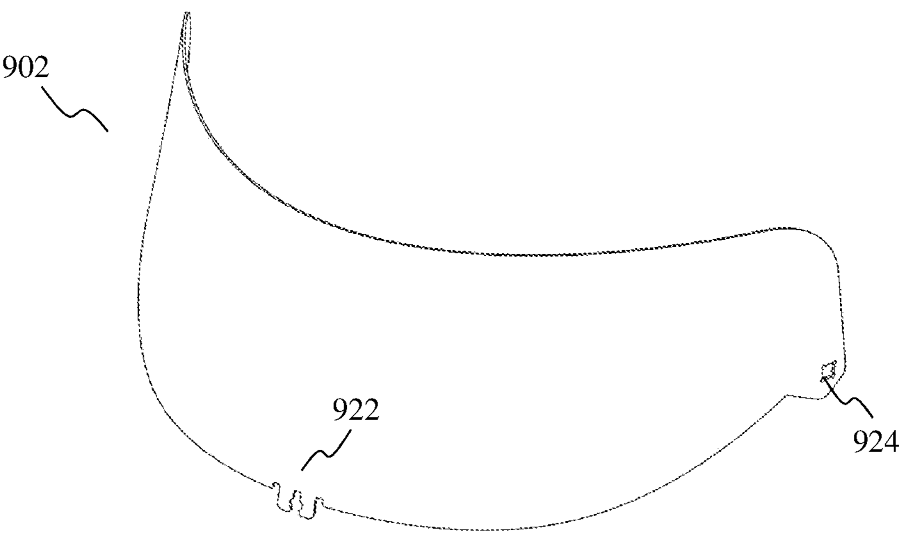

FIGS. 10A and 10B show the eye shield 902 according to various embodiments. The eye shield 902 may be substantially transparent. The eye shield 902 may be formed from a clear polymer, such as polycarbonate.

Referring to FIG. 10A, the eye shield 902 may be cut out from a flat, planar material. For example, it may be formed by die-cut on a flat piece of polymer. The eye shield 902 may be shaped to include the front fastener 922. The front fastener 922 may include at least two extending members 1026, separated by a center groove 1020. Each of the extending members 1026 may have a side groove 1022 adjacent to it. The front fastener 922 may fasten onto the cover shield 102 using the extending members 1026. The front fastener 922 may hook onto the skin cushion 108. The skin cushion 108 may include complementary cavities (not shown in FIG. 10A) shaped to receive the extending members 1026 of the front fastener 922. The cavities will be described with respect to FIGS. 12A and 12B. The eye shield 902 may have at least one hole 924 in a vicinity of opposite side edges of the eye shield 902. The hole 924 may be shaped to receive the mounting member 920.

Referring to FIG. 10B, the eye shield 902 may be flexible to conform to a shape of the cover shield 102. For example, the cover shield 102 may be curved, and the eye shield 902 may be deformed to form a corresponding curvature, so that the eye shield 902 may be mounted above the cover shield 102.

Figure 11A:
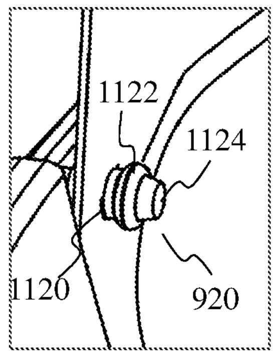
FIGS. 11A and 11B shows a mounting member on a cover shield and a hole on the eye shield, respectively, according to various embodiments.
Figure 11B:
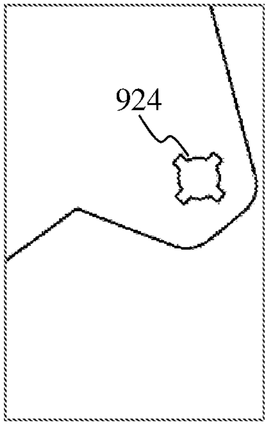

FIGS. 11A and 11B shows the mounting member 920 on the cover shield 102 and the hole 924 on the eye shield 902, respectively, according to various embodiments. The mounting member 920 may have a first end 1120 coupled to the cover shield 102, and a second end 1124 opposite to the first end. The mounting member 920 may include a catch member 1122 between the first end 1120 and the second end 1124. The first end 1120 and the second end 1124 may be smaller in diameter than the hole 924 on the eye shield 902, while the catch member 1122 may be larger in diameter than the hole 924. The mounting member 920 may be resilient and deformable. To mount the eye shield 902 to the cover shield 102, the mounting member 920 may be pushed into the hole 924. When the mounting member 920 is pushed into the hole 924, the mounting member may be deformed so that the catch member 1122 can pass through the hole 924.

Figure 12A:
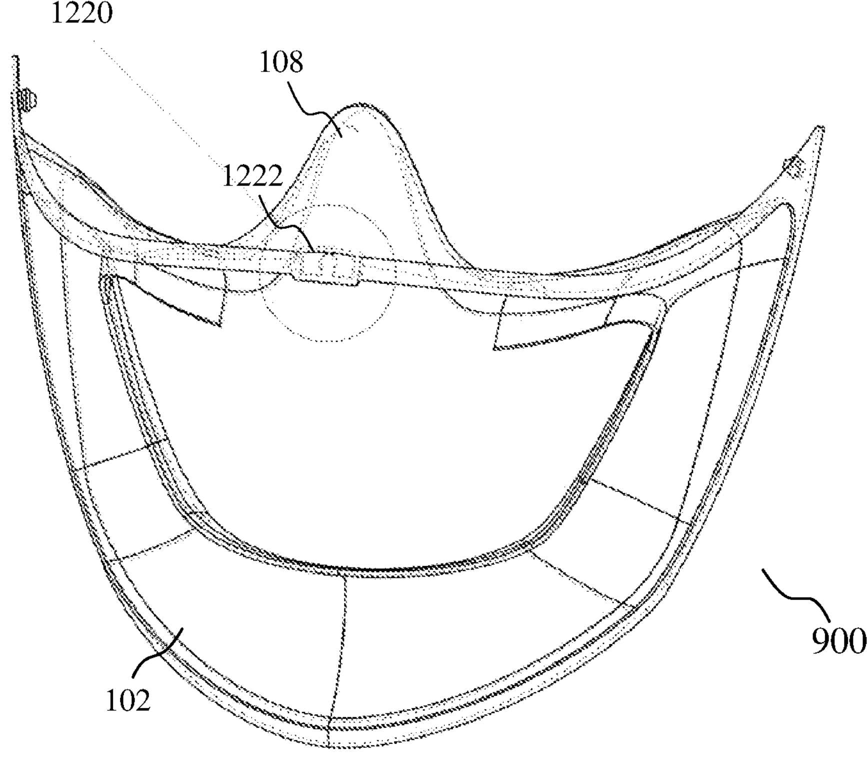
FIGS. 12A and 12B show views of cavities in the skin cushion of the face mask according to various embodiments.
Figure 12B:
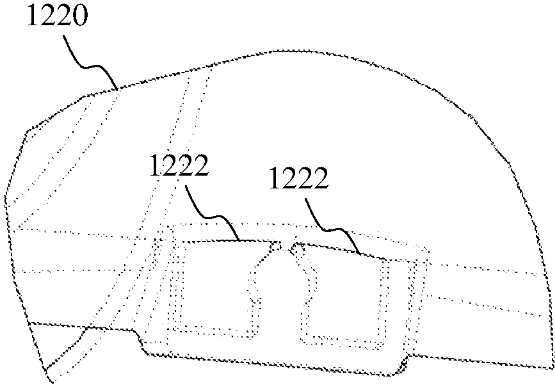

FIGS. 12A and 12B show views of the cavities 1222 in the skin cushion 108 according to various embodiments. FIG. 12A shows a simplified view of the face mask 900 where the eye shield 902, the input fan 104 and output fan 106 are omitted for brevity. The skin cushion 108 may include a plurality of cavities 1222 arranged along an upper edge of the cover shield 102. The cavities 1222 may be positioned to match the front fastener 922. The cavities 1222 may be shaped to receive the extending members 1026 of the front fastener 922 in them. The front fastener 922 of the eye shield 902 may hook onto the cavities 1222 to attach the eye shield 902 onto the cover shield 102. FIG. 12B shows an enlarged view of the region 1220 of FIG. 12A.

Figure 13:
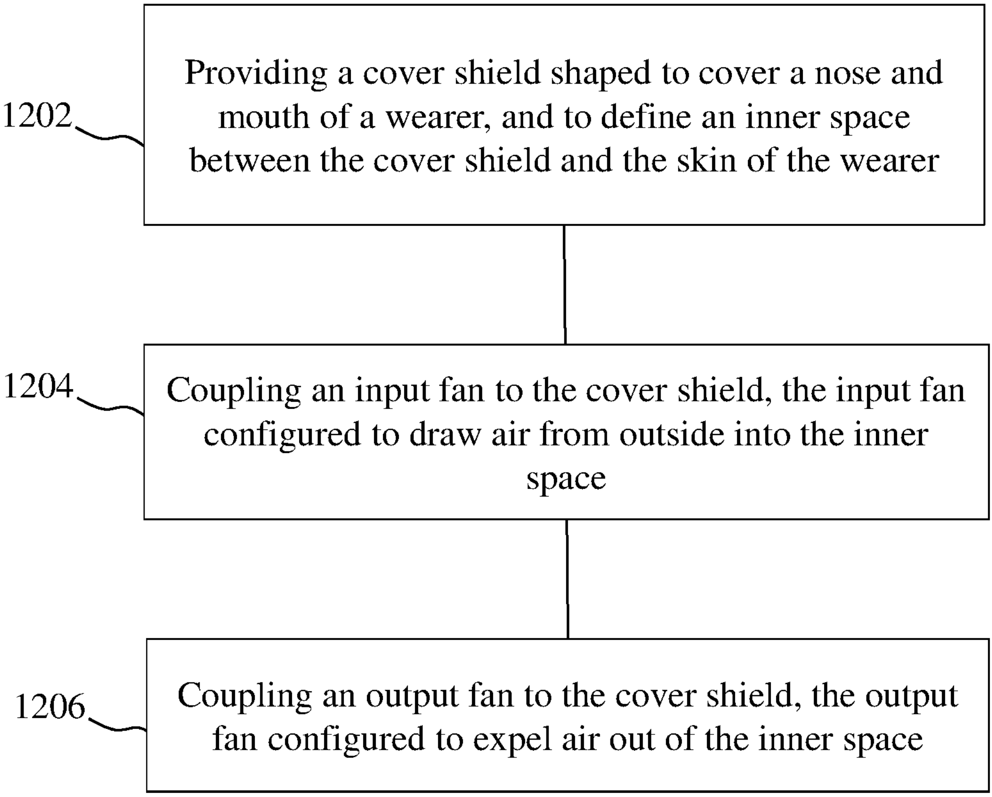
FIG. 13 is a flow diagram showing a method of fabricating a face mask according to various embodiments.

FIG. 13 is a flow diagram showing a method of fabricating a face mask according to various embodiments. The method may include providing a cover shield shaped to cover the nose and mouth of a wearer, in 1202. The cover shield may define an inner space between the cover shield and the skin of the wearer. The method may further include coupling an input fan to the cover shield, in 1204. The input fan may be configured to draw air from outside into the inner space. The method may further include coupling an output fan to the cover shield, in 1206. The output fan may be configured to expel air out of the inner space.

The following examples pertain to further embodiments.

Example 1 is a face mask including a cover shield shaped to cover nose and mouth of a wearer, and defining an inner space between the cover shield and the skin of the wearer; an input fan coupled to the cover shield, wherein the input fan is configured to draw air from outside into the inner space; and an output fan coupled to the cover shield, wherein the output fan is configured to expel air out of the inner space.

In example 2, the subject-matter of example 1 may further include that the input fan and the output fan are arranged symmetrically about a vertical centre line of the cover shield.

In example 3, the subject-matter of any one of examples 1 to 2 may further include that the input fan is positioned to the cover shield such that the air drawn into the inner space is directed towards at least one of the nose and the mouth of the wearer.

In example 4, the subject-matter of any one of examples 1 to 3 may further include that the output fan is positioned to the cover shield such that the output fan draws away air exhaled from at least one of the nose and the mouth of the wearer.

In example 5, the subject-matter of any one of examples 1 to 4 may further include: an input air guiding member coupled to the input fan and extending into the inner space, the input air guiding member adapted to direct air flow from the input fan to at least one of the nose and mouth of the wearer; and an output air guiding member coupled to the output fan and extending into the inner space, the output air guiding member adapted to direct air flow from at least one of the nose and mouth of the wearer to the output fan.

In example 6, the subject-matter of any one of examples 1 to 5 may further include that the input fan includes a filter holder configured to hold a filter element for filtering air drawn into the inner space.

In example 7, the subject-matter of any one of examples 1 to 6 may further include that the output fan includes a filter holder configured to hold a filter element for filtering air exhaled from at least one of the nose and the mouth of the wearer.

In example 8, the subject-matter of any one of examples 1 to 7 may further include that the cover shield is impermeable to fluids.

In example 9, the subject-matter of any one of examples 1 to 8 may further include that the cover shield is substantially transparent.

In example 10, the subject-matter of any one of examples 1 to 9 may further include that the cover shield has an inlet aperture and an outlet aperture formed therein, wherein the input fan is fitted to the inlet aperture, and wherein the output fan is fitted to the outlet aperture.

In example 11, the subject-matter of any one of examples 1 to 10 may further include: at least one mounting member in a vicinity to an upper edge of the cover shield, wherein the at least one mounting member is configured to removably affix an eye shield above the cover shield for covering the eyes of the wearer.

In example 12, the subject-matter of example 11 may further include: the eye shield.

In example 13, the subject-matter of example 12 may further include that the eye shield is flexible to conform to a shape of the cover shield.

In example 14, the subject-matter of any one of examples 1 to 13 may further include: a light emitter arrangement coupled to the cover shield for illuminating the face of the wearer.

In example 15, the subject-matter of any one of examples 1 to 14 may further include: a light signaling member coupled to at least one of the input fan and the output fan, wherein the light signaling member is arranged to emit light in a direction away from the face of the wearer.

In example 16, the subject-matter of example 15 may further include: a wireless transceiver equipment coupled to the light signaling member, wherein the wireless transceiver equipment is configured to receive data including operating instructions, wherein the light signaling member is configured to operate according to the operating instructions in the received data.

In example 17, the subject-matter of any one of examples 15 to 16 may further include: an electrical connector coupled to the light signaling member, wherein the electrical connector is configured to receive data including operating instructions, wherein the light signaling member is configured to operate according to the operating instructions in the received data.

In example 18, the subject-matter of any one of examples 1 to 17 may further include: a skin cushion arranged along a periphery of the cover shield, wherein the skin cushion is adapted to abut against the skin of the wearer for sealing the inner space from outside.

In example 19, the subject-matter of example 18 may further include that the skin cushion includes a compressible material for conforming to the shape of the face of the wearer.

Example 20 is a method of fabricating a face mask. The method may include: providing a cover shield shaped to cover the nose and mouth of a wearer, wherein the cover shield defines an inner space between the cover shield and the skin of the wearer; coupling an input fan to the cover shield, wherein the input fan is configured to draw air from outside into the inner space; and coupling an output fan to the cover shield, wherein the output fan is configured to expel air out of the inner space.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose. As used herein, the singular forms “a”, “an” and “the” are intended to include the plural forms as well, unless the context clearly indicates otherwise. It will be further understood that the terms “comprises” and/or “comprising.” when used in this specification, specify the presence of stated features, integers, steps, operations, elements, and/or components, but do not preclude the presence or addition of one or more other features, integers, steps, operations, elements, components, and/or groups thereof. Unless specifically stated otherwise, the term “some” refers to one or more. Combinations such as “at least one of A, B, or C,” “one or more of A, B, or C.” “at least one of A, B, and C.” “one or more of A, B, and C,” and “A, B, C, or any combination thereof” include any combination of A, B, and/or C, and may include multiples of A, multiples of B, or multiples of C. Specifically, combinations such as “at least one of A, B, or C,” “one or more of A, B, or C,” “at least one of A, B, and C.” “one or more of A, B, and C,” and “A, B, C, or any combination thereof” may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.”

The invention claimed is:

1. A face mask comprising:

a cover shield shaped to cover nose and mouth of a wearer, and defining an inner space between the cover shield and the skin of the wearer;

an input fan coupled to the cover shield, wherein the input fan is configured to draw air from outside into the inner space; and an output fan coupled to the cover shield, wherein the output fan is configured to expel air out of the inner space, wherein at least one of the input fan and the output fan comprises a fan cover, the fan cover comprising:

at least one opening to allow air flow; and a light transmissive window surrounding the at least one opening; and a light signaling member fitted into a cavity in the fan cover, wherein the light signaling member is configured to emit light out of the light transmissive window in a direction away from the face of the wearer.

2. The face mask of claim 1, wherein the input fan and the output fan are arranged symmetrically about a vertical centre line of the cover shield.

3. The face mask of claim 1, wherein the input fan is positioned to the cover shield such that the air drawn into the inner space is directed towards at least one of the nose and the mouth of the wearer.

4. The face mask of claim 1, wherein the output fan is positioned to the cover shield such that the output fan draws away air exhaled from at least one of the nose and the mouth of the wearer.

5. The face mask of claim 1, further comprising:

an input air guiding member coupled to the input fan and extending into the inner space, the input air guiding member adapted to direct air flow from the input fan to at least one of the nose and mouth of the wearer; and an output air guiding member coupled to the output fan and extending into the inner space, the output air guiding member adapted to direct air flow from at least one of the nose and mouth of the wearer to the output fan.

6. The face mask of claim 1, wherein the input fan comprises a filter holder configured to hold a filter element for filtering air drawn into the inner space.

7. The face mask of claim 1, wherein the output fan comprises a filter holder configured to hold a filter element for filtering air exhaled from at least one of the nose and the mouth of the wearer.

8. The face mask of claim 1, wherein the cover shield is impermeable to fluids.

9. The face mask of claim 1, wherein the cover shield is substantially transparent.

10. The face mask of claim 1, wherein the cover shield has an inlet aperture and an outlet aperture formed therein, wherein the input fan is fitted to the inlet aperture, and wherein the output fan is fitted to the outlet aperture.

11. The face mask of claim 1, further comprising:

an eye shield; and at least one mounting member in a vicinity to an upper edge of the cover shield, wherein the at least one mounting member is configured to removably affix an eye shield above the cover shield for covering the eyes of the wearer.

12. The face mask of claim 11, wherein the eye shield is flexible to conform to a shape of the cover shield.

13. The face mask of claim 1, further comprising:

a light emitter arrangement coupled to the cover shield for illuminating the face of the wearer.

14. The face mask of claim 1, further comprising:

an electrical connector coupled to the light signaling member, wherein the electrical connector is configured to receive data comprising operating instructions, wherein the lightsignalling signaling member is configured to operate according to the operating instructions in the received data.

15. The face mask of claim 1, further comprising:

a skin cushion arranged along a periphery of the cover shield, wherein the skin cushion is adapted to abut against the skin of the wearer for sealing the inner space from outside.

16. The face mask of claim 15, wherein the skin cushion comprises a compressible material for conforming to the shape of the face of the wearer.

17. A method of fabricating a face mask, the method comprising:

providing a cover shield shaped to cover the nose and mouth of a wearer, wherein the cover shield defines an inner space between the cover shield and the skin of the wearer;

coupling an input fan to the cover shield, wherein the input fan is configured to draw air from outside into the inner space; and coupling an output fan to the cover shield, wherein the output fan is configured to expel air out of the inner space, wherein at least one of the input fan and the output fan comprises a fan cover, the fan cover comprising:

at least one opening to allow air flow; and a light transmissive window surrounding the at least one opening; and fitting a light signaling member into a cavity in the fan cover, the light signaling member arranged to emit light out of the light transmissive window in a direction away from the face of the wearer.

18. The face mask of claim 1, wherein the light signaling member comprises a light guide arranged to be in register with the light transmissive window and a light emitter configured to emit the light through the light guide and out of the light transmissive window in the direction away from the face of the wearer, wherein the light guide is configured to diffuse the light emitted by the light emitter.

19. The face mask of claim 1, wherein the fan cover comprises:

a top cap comprising the at least one opening;

a front cap housing fitted around the top cap; and a back cap housing, wherein the light transmissive window is provided on at least one of the top cap and the front cap housing, and the light signaling member is arranged between the front cap housing and the back cap housing.

20. The face mask of claim 19, wherein the front cap housing surrounds the top cap circumferentially and includes a circumferential groove adapted to receive the light signaling member.

* * * * *